US008528619B1

(12) United States Patent
Watts

(10) Patent No.: US 8,528,619 B1

(45) Date of Patent: Sep. 10, 2013

(54) HIGHLIGHTER TAPE PEN ASSEMBLY

(76) Inventor: Mario Watts, Florissant, MO (US)

( * ) Notice: Subject to any disclaimer, the term of this patent is extended or adjusted under 35 U.S.C. 154(b) by 59 days.

(21) Appl. No.: 13/405,346

(22) Filed: Feb. 26, 2012

(51) Int. Cl.

| | |
|---|---|
| ***B32B 37/26*** | (2006.01) |
| ***B26F 3/02*** | (2006.01) |
| ***B43L 19/00*** | (2006.01) |

(52) U.S. Cl.

USPC ........... 156/577; 156/526; 156/527; 156/579; 242/588; 242/588.3; 242/588.6; 206/411

(58) Field of Classification Search

USPC ................. 156/523, 527, 538, 540, 547, 577, 156/579, 526; 118/76, 200, 257; 225/46; 242/160.2, 160.4, 170, 171, 588, 588.2, 588.3; 206/411

See application file for complete search history.

(56) References Cited

U.S. PATENT DOCUMENTS

| | | | | |
|---|---|---|---|---|
| 4,904,334 | A | 2/1990 | Honma et al. | |
| 4,913,946 | A | 4/1990 | Sala et al. | |
| 5,076,883 | A | 12/1991 | Bosley | |
| 5,707,482 | A | 1/1998 | Fusselman | |
| D492,347 | S | 6/2004 | Qiu | |
| 6,783,293 | B2 * | 8/2004 | Watanabe et al. | 401/195 |
| 6,802,354 | B2 * | 10/2004 | Bouveresse | 156/522 |
| 2006/0084558 | A1 * | 4/2006 | Watanabe | 483/59 |
| 2007/0071971 | A1 | 3/2007 | Drogan | |

* cited by examiner

*Primary Examiner* — Mark A Osele

(57) ABSTRACT

A highlighter tape pen assembly is provided for impermanently highlighting a selectable portion of a surface with removable tape. The assembly includes a pen-like dispenser having a first portion releasably attachable to a second portion, a generally hemi-cylindrical trough removably insertable within the pen-like dispenser, the trough having an in-use tape reel of highlighting tape removably rotatably disposed on a spool pin, the in-use tape reel having a leading strand extendible through a narrow guide channel disposed on a front end of the trough, said guide channel projecting through a tip section disposed on a first end of the first portion of the pen-like dispenser, with a cutting edge disposed endwise on the guide channel, whereby a section of relevant text, or other surface, may be easily and impermanently highlighted with removable tape.

10 Claims, 5 Drawing Sheets

HIGHLIGHTER TAPE PEN ASSEMBLY

BACKGROUND OF THE DISCLOSURE

Field of the Disclosure

The disclosure relates to highlighter devices and more particularly pertains to a new highlighter device for impermanently highlighting a selectable portion of a surface with removable tape.

SUMMARY OF THE DISCLOSURE

An embodiment of the disclosure meets the needs presented above by generally comprising a pen-like dispenser having a first portion releasably attachable to a second portion, a generally hemi-cylindrical trough removably insertable within the pen-like dispenser, the trough having an in-use tape reel of highlighting tape removably rotatably disposed on a spool pin, the in-use tape reel having a leading strand extended through a narrow guide channel disposed on a front end of the trough, said guide channel projecting through a tip section disposed on a first end of the first portion of the pen-like dispenser, with a cutting edge disposed endwise on the guide channel, whereby a section of relevant text, or other surface, may be easily impermanently highlighted with highlighting tape, and a plurality of tape reels are storable within an interior cavity disposed in the second portion, said plurality of tape reels useable to replace the in-use tape reel, the diameter of a reel portion of the in-use tape reel readily discernible through a transparent section disposed in the first portion of the pen-like dispenser.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
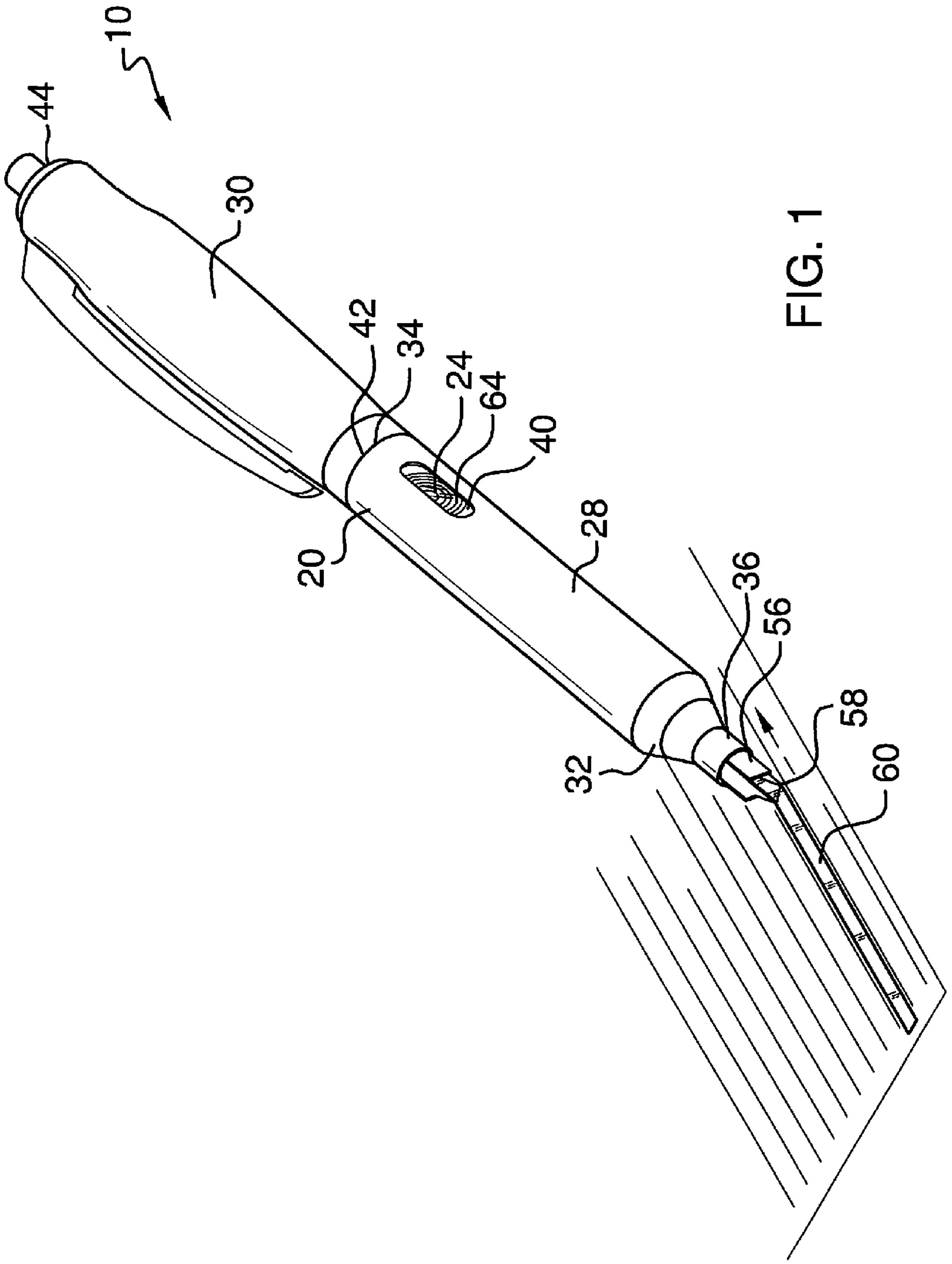
FIG. 1 is a top front side perspective view of a highlighter tape pen assembly according to an embodiment of the disclosure.
Figure 2:
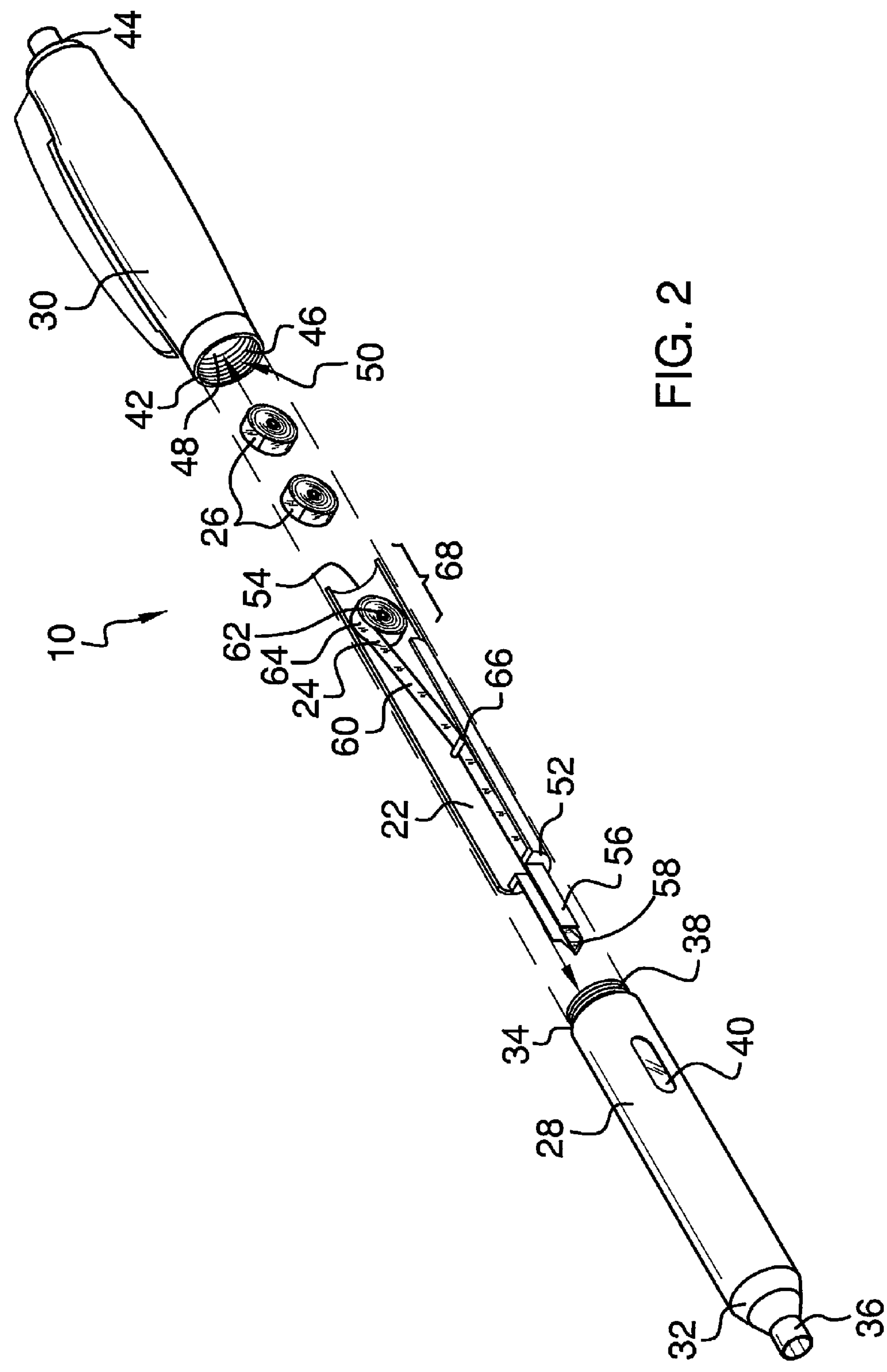
FIG. 2 is an exploded top front side perspective view of an embodiment of the disclosure.
Figure 3:
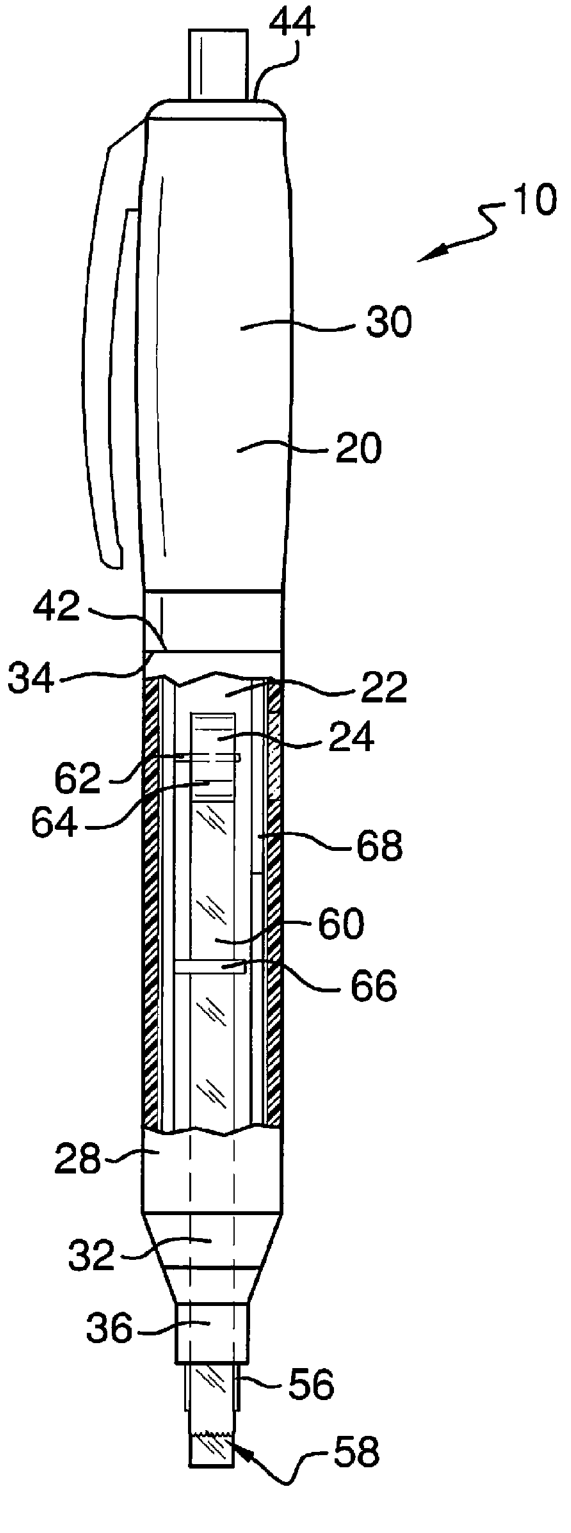
FIG. 3 is a partial cut-away top view of an embodiment of the disclosure.
Figure 4:
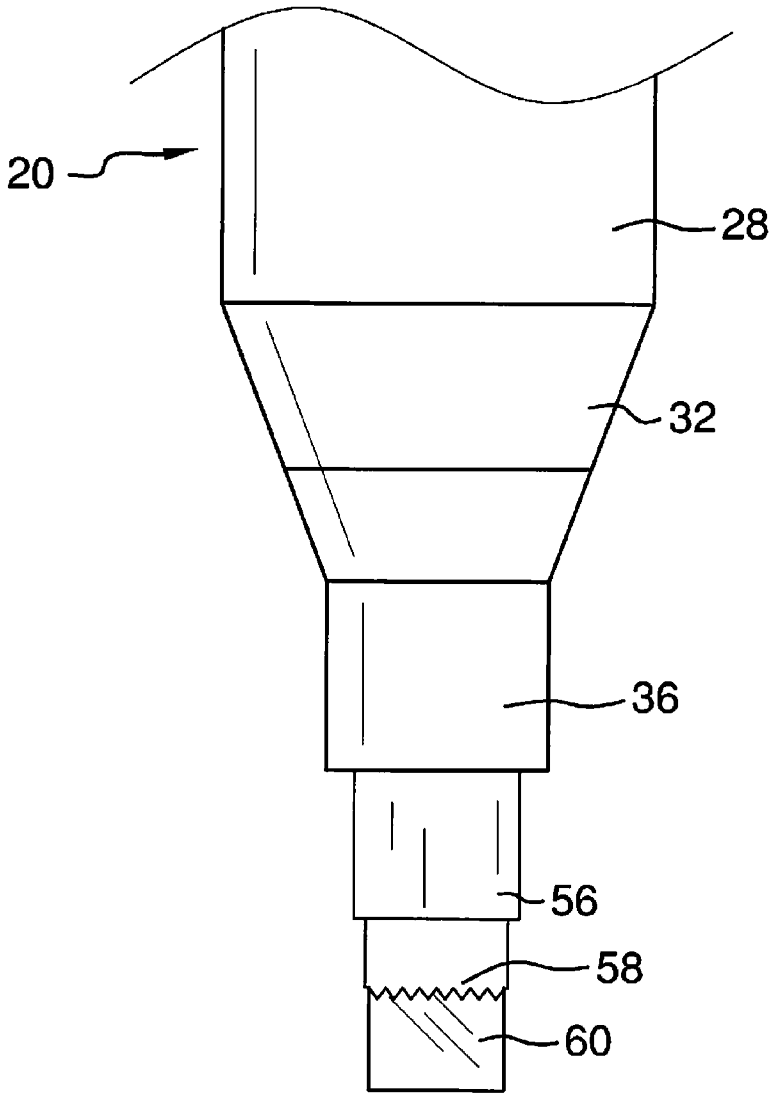
FIG. 4 is an enlarged top view of an embodiment of the disclosure.
Figure 5:
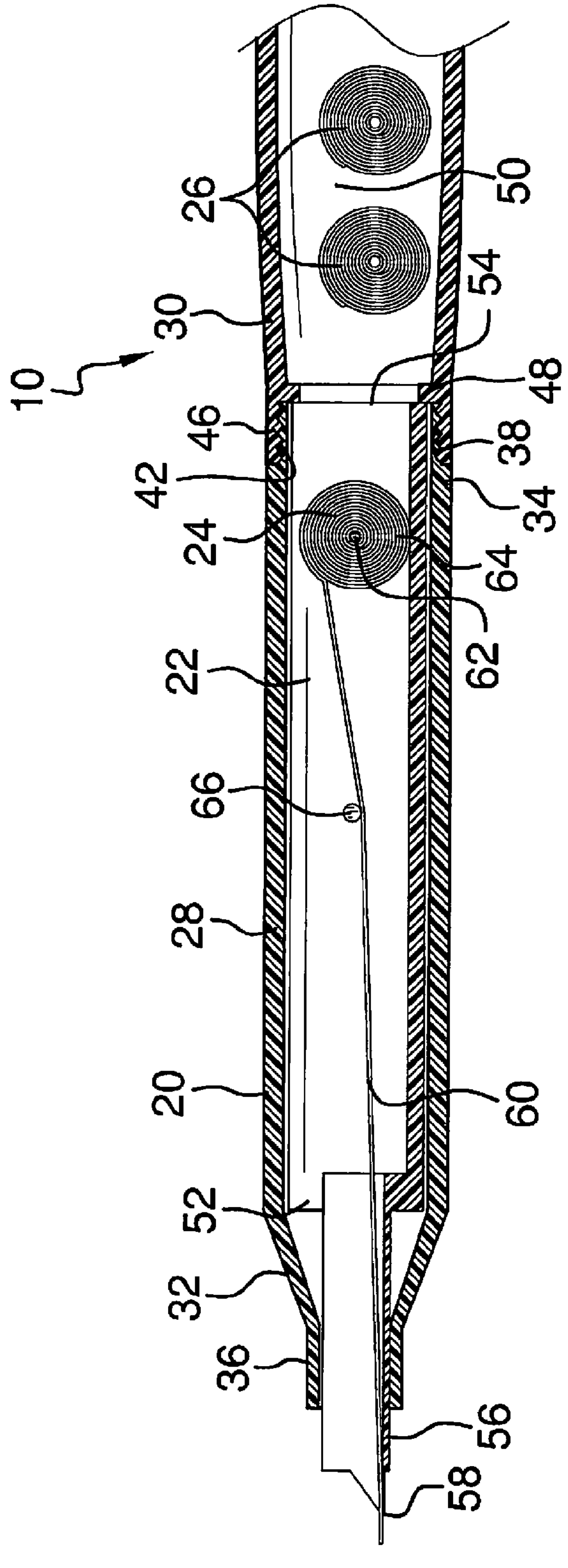
FIG. 5 is a cross-sectional view of an embodiment of the disclosure.

With reference now to the drawings, and in particular to FIGS. 1 through 5 thereof, a new highlighter device embodying the principles and concepts of an embodiment of the disclosure and generally designated by the reference numeral 10 will be described.

As best illustrated in FIGS. 1 through 5, the highlighter tape pen assembly 10 generally comprises a pen-like dispenser 20, a generally hemi-cylindrical trough 22, an in-use tape reel 24, and a plurality of tape reels 26 of highlighting tape. The trough 22 is removably inserted into the pen-like dispenser 20, as will de described subsequently, and the in-use tape reel 24 and the plurality of tape reels 26 are removably disposed within the pen-like dispenser 20, as will also be described subsequently.

The pen-like dispenser 20 includes a first portion 28 and a second portion 30. The first portion 28 includes a first end 32 and a second end 34. An infundibular tip section 36 is disposed on the first end 32. A first threaded section 38 is disposed on the second end 34. A transparent section 40 is disposed on the first portion 28 proximal the second end 34.

The second portion 30 is releasably attachable to the first portion 28. The second portion 30 includes an open end 42, a top end 44, and a second threaded section 46 disposed on the open end 42. The second threaded section 46 is releasably attachable to the first threaded section 38. A collar 48 is circumferentially disposed interiorly within the open end 42, the collar 48 disposed behind the second threaded section 46. The collar 48 engages with the trough 22 when the trough 22 is inserted into the pen-like dispenser 20 and the second portion 30 is joined to the first portion 28. The collar 48 thusly maintains the position of the trough 22 within the pen-like dispenser 20 and an interior cavity 50 is disposed between the open end 42 and the top end 44.

The generally hemi-cylindrical trough 22 is removably insertable into the first portion 28 and the second portion 30. The trough 22 includes a front end 52, a rear end 54, and a narrow guide channel 56 disposed forwards on the front end 52. The guide channel 56 projects out of the tip section 36 of the first portion 28 when the trough 22 is inserted into the pen-like dispenser 20. A cutting edge 58 is disposed endwise on the guide channel 56, the cutting edge 58 configured to cut a leading strand 60 of the in-use tape reel 24 when desired.

A spool pin 62 is disposed proximal to the rear end 54. The in-use tape reel 24 is removably, rotatably mounted to the spool pin 62. The in-use tape reel 24 includes the leading strand 60 unspooled from a reel portion 64. The reel portion 64 is rotatably mounted to the spool pin 62 and the leading strand 60 is unspooled from the reel portion 64 to the guide channel 56.

A guide pin 66 is disposed in the trough 22 approximately midway between the front end 52 and the rear end 54, the guide pin 66 disposed in a plane parallel with the spool pin 62. This guide pin 66 engages with the leading strand 60 of the in-use tape reel 24 and provides an even feed of the leading strand 60 when the reel portion 64 unspools with use of the highlighter tape pen 10. A cutaway section 68 is disposed in the trough 22 proximal to the rear end 54, the cutaway section 68 disposed opposite the spool pin 62. The cutaway section 68 enables easy access to the spool pin 62 for changing out the in-use tape reel 24, as desired.

Thusly, an in-use tape reel 24 may be mounted on the spool pin 62, with a leading strand 60 pulled down to the guide channel 56, the trough 22 reinserted into the pen-like dispenser 20 when the second portion 30 is attached to the first portion 28 by means of the second 46 and first 38 threaded sections mating, and the in-use tape reel 24 dispensed onto a surface to impermanently highlight the surface with removable tape. The guide channel 56 projects out the tip section 36 of the first portion 28, and the leading strand 60 may be easily attached to a surface and applied along a straight trajectory until the leading strand 60 is severed from the guide channel 56 by means of the cutting edge 58 disposed thereon.

The plurality of tape reels 26 includes at least two tape reels storable in the interior cavity 50 of the second portion 30 of the pen-like dispenser 20. To replace the in-use tape reel 24, the second portion 30 is separated from the first portion 28 and the plurality of tape reels 26 is accessed from the interior cavity 50. The expended in-use tape reel 24 is replaced with one of the plurality of tape reels 26, as desired. Tape reels include regular highlighting tape (a translucent, colored tape, suitable for overlying relevant text highlighted for future reference) and opaque tape used to delete, mask, or obscure relevant sections of text or diagrams, as preferred.

In use, the tape reel 24 is mounted to the spool pin 62 with the leading strand 60 extended out of the dispenser 20 to be dispensed onto the surface providing impermanent highlighting to the surface.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A highlighter tape pen comprising:

a pen shaped dispenser having a generally cylindrical first portion, the first portion having a first end, a second end, a first threaded section disposed on the second end, and a tip section disposed on the first end, the dispenser having a generally cylindrical second portion releasably attachable to the first portion, the second portion having an open end, a top end, and a second threaded section disposed on the open end of the second portion, the second threaded section being releasably attachable to the first threaded section;

a generally hemi-cylindrical trough removably insertable into the first portion second end and the second portion open end, the trough having a front end, a rear end, and a narrow guide channel disposed on the front end;

a cutting edge disposed endwise on the guide channel;

a spool pin disposed proximal to the rear end of the trough;

an in-use tape reel removably rotatably disposed on the spool pin, the in-use tape reel comprising a reel portion and a leading strand; and wherein the leading strand is extended through the guide channel, the guide channel extends out of the tip section of the first portion when the trough is inserted into the pen-like dispenser, and the leading strand is extendible across a surface unspooling from the reel portion, whereby a surface is impermanently highlighted by removable tape.

2. The highlighter tape pen of claim 1 wherein the first portion further comprises a transparent section.

3. The highlighter tape pen of claim 2 wherein the second portion further comprises a collar circumferentially disposed interiorly within the open end beneath the second threaded section, wherein the rear end of the trough abuts the collar when the trough is inserted into the pen shaped dispenser and the second portion is attached to the first portion.

4. The highlighter tape pen of claim 3 wherein the second portion further comprises an interior cavity between the open end and the top end.

5. The highlighter tape pen of claim 4 wherein the interior cavity can fit and store a plurality of tape reels therein.

6. The highlighter tape pen of claim 4 wherein the in-use tape reel is visible through the transparent section when mounted to the spool pin and the diameter of the reel portion is discernible therethrough.

7. The highlighter tape pen of claim 6 wherein the cutting edge is a serrated blade.

8. The highlighter tape pen of claim 7 wherein the trough further comprises a guide pin disposed approximately midway between the front end and the rear end, the guide pin engaging the leading strand in a plane parallel with the spool pin.

9. The highlighter tape pen of claim 8 wherein the trough further comprises a cutaway section disposed proximal the rear end, the cutaway section enabling ease of access to the spool pin when mounting and replacing the in-use tape reel.

10. A highlighter tape pen comprising:

a pen shaped dispenser having a first portion, the first portion having a first end, a second end, a first threaded section disposed on the second end, a transparent section disposed proximal to the second end, and a tip section disposed on the first end;

a second portion of the pen-like dispenser being releasably attachable to the first portion, the second portion having an open end, a top end, a second threaded section disposed on the open end, and the second threaded section being releasably attachable to the first threaded section;

a collar circumferentially disposed interiorly within the open end, the collar disposed behind the second threaded section;

an interior cavity disposed between the open end and the top end;

a generally hemi-cylindrical trough removably insertable into the first portion and the second portion, the trough having a front end, a rear end, and a narrow guide channel disposed on the front end;

a cutting edge disposed endwise on the guide channel;

a spool pin disposed proximal to the rear end;

a guide pin disposed approximately midway between the front end and the rear end, the guide pin disposed in a plane parallel with the spool pin;

a cutaway section disposed proximal to the rear end;

an in-use tape reel removably rotatably disposed on the spool pin, the tape reel comprising a reel portion and a leading strand;

wherein the interior cavity can fit and store a plurality of tape reels therein; and wherein the rear end of the trough abuts the collar when the trough is inserted into the pen shaped dispenser and the second portion is attached to the first portion, the narrow guide channel extends out the tip section of the first portion, the transparent section overlies the reel portion, and the leading strand is extendible across a surface, unspooling from the reel portion, whereby a surface is impermanently highlighted by removable tape.

* * * * *